May 19, 1953 P. DARABARIS 2,638,678
VARIABLE PRECISION MEASURING INSTRUMENT
Filed April 30, 1952 2 Sheets-Sheet 1
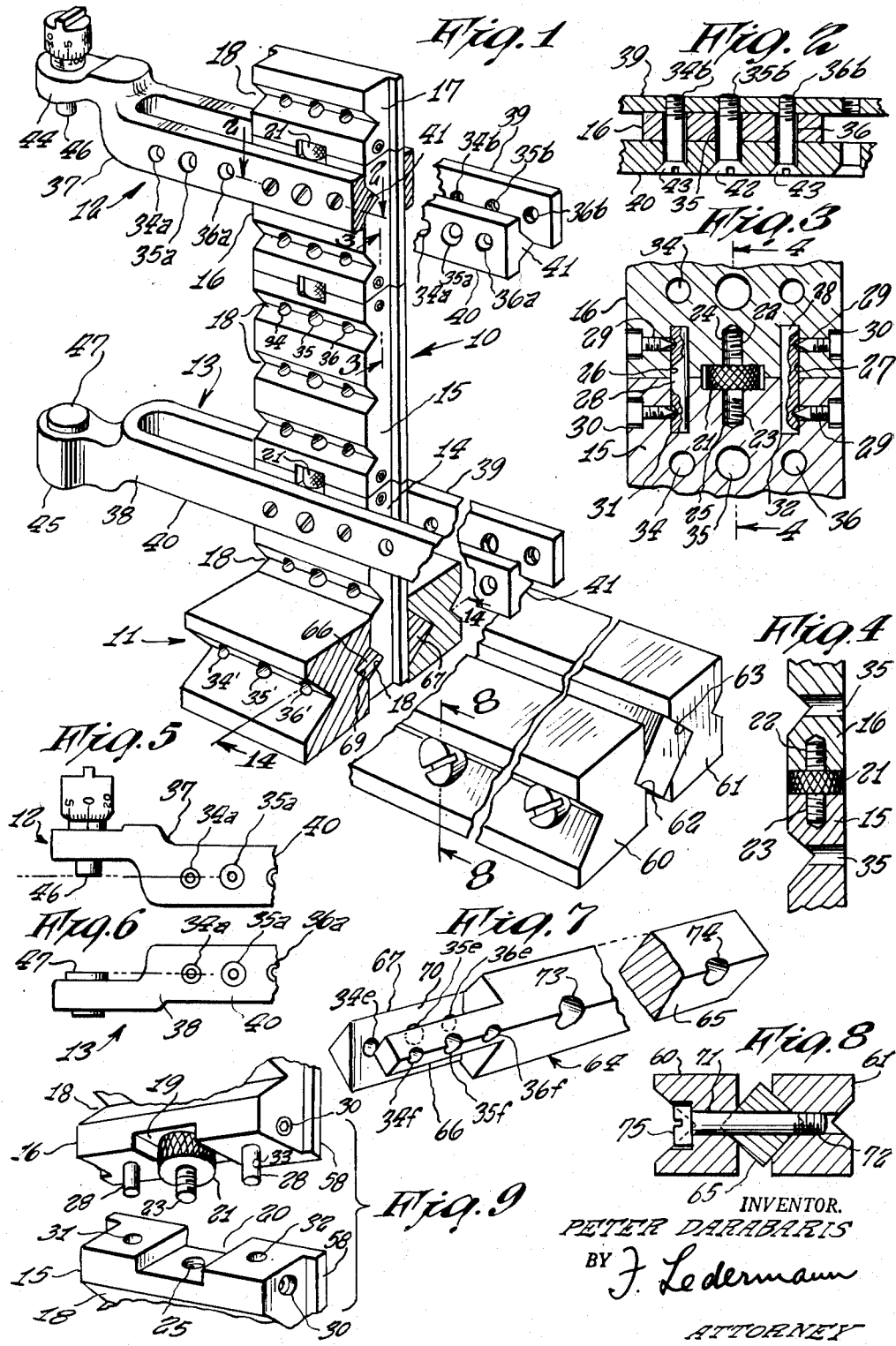
INVENTOR.
PETER DARABARIS
BY F. Lederman
ATTORNEY May 19, 1953  P. DARABARIS  2,638,678
VARIABLE PRECISION MEASURING INSTRUMENT
Filed April 30, 1952  2 Sheets-Sheet 2
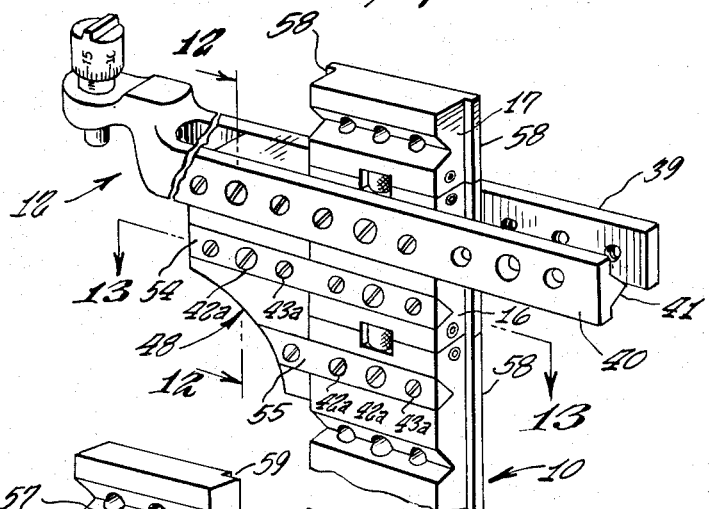
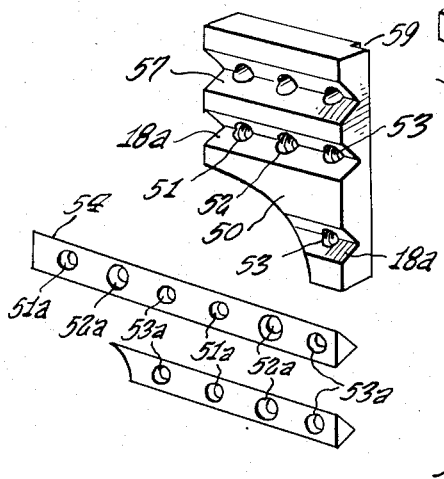
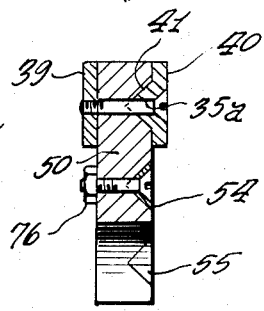
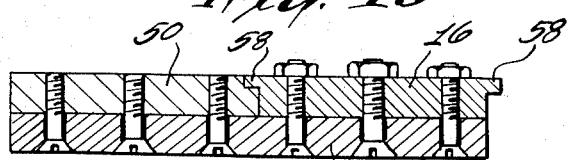
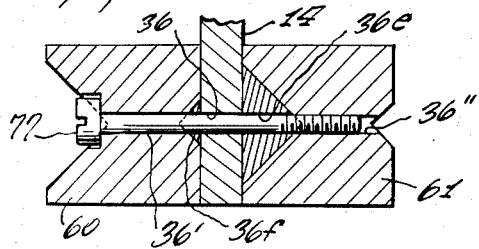
INVENTOR.
PETER DARABARIS
BY F. Ledermann
ATTORNEY Patented May 19, 1953

2,638,678

UNITED STATES PATENT OFFICE 2,638,678

VARIABLE PRECISION MEASURING INSTRUMENT

Peter Darabaris, Clifton, N. J.

Application April 30, 1952, Serial No. 285,264

10 Claims. (Cl. 33—164)

This invention relates to precision measuring instruments, and an important object thereof is the provision of an adjustable combination measuring instrument made or built up of a plurality of parts or members some or all of which may be used at one time and including the necessary parts of a micrometer, as a result of which the present instrument, or rather the parts thereof, may be used for an extended range or variety of measurements instead of requiring a relatively large number of separate instruments of graduated sizes. As a result, since such instruments are expensive, a considerable amount of saving in the cost of instruments is obtained and this feature is an especially desirable one in the case of small machine shops. Moreover, as in the case of the present invention, when the instrument is wholly or partly disassembled, it can be packed very compactly thereby saving considerable space which is needed for comparable tools.

The above broad as well as additional and more specific objects will be clarified in the following description wherein characters of reference refer to like-numbered parts in the accompanying drawings. It is to be noted that the drawings are intended solely for the purpose of illustration and that it is therefore neither desired nor intended to limit the invention necessarily to any or all of the exact details of construction shown or described except insofar as they may be deemed essential to the invention. Moreover, only sufficient applications or uses of the invention are set forth to provide a clear understanding of the construction and operation of the instrument, and it is to be understood that other and additional applications and uses of the tool, in whole or in part, are of course possible.

Referring briefly to the drawings, Fig. 1 is a perspective view of the assembled precision measuring instrument, with parts broken away and partly in section, illustrating one form in which it may be used.

Fig 2 is a sectional view taken on the line 2—2 of Fig. 1.

Fig. 3 is a sectional view taken on the line 3—3 of Fig. 1.

Fig. 4 is a sectional view taken on the line 4—4 of Fig. 3.

Fig. 5 is a fragmentary front elevational view of the micrometer screw arm showing the position of the micrometer screw relative to the horizontally aligned holes in the arm for zero setting of the screw.

Fig. 6 is a similar view of the micrometer anvil arm.

Fig. 7 is a perspective view, with parts broken away and partly in section, of the removable locking member or key shown in Fig. 1 for locking the V-blocks to the lower end of the instrument column to form the base thereof as well as the shorter arm of what together with the column forms a square.

Fig. 8 is a sectional view taken on the line 8—8 of Fig. 1.

Fig. 9 is a fragmentary exploded perspective view of two mutually adjacent precision blocks of which the column of Fig. 1 is made up, illustrating the means for interlocking the said blocks.

Fig. 10 is a fragmentary perspective view of the instrument of Fig. 1 with the addition of a reinforcing bracket member to prevent deflection of the upper micrometer arm; for the sake of simplicity the said arm is not shown as extending far from the column, but actually the bracket is particularly applicable when the said arm is extended farther to the left of the column.

Fig. 11 is an exploded perspective view of the bracket shown in Fig. 10, per se, and of the V-rods used in association therewith.

Fig. 12 is a sectional view taken on the line 12—12 of Fig. 10.

Fig. 13 is a sectional view taken on the line 13—13 of Fig. 10.

Fig. 14 is a sectional view taken on the line 14—14 of Fig. 1.

Referring in detail to the drawings, the assembled precision measuring instrument shown in Fig. 1 comprises the column 10 having the base 11 attached thereto and also having the micrometer screw arm 12 and the micrometer anvil arm 13 extending therefrom. The column 10 is built up of a plurality of blocks or sections 14, 15, 16 and 17; there may, of course, be more or less than the four shown. Each such block contains one or more horizontal V-grooves or slots 18, the number of which is dependent upon the height of the particular block. All of the grooves or slots 18 are identical in dimensions and the height of each block is such that the distance from the upper edge of the uppermost slot to the top surface of the block is constant for all the blocks, as is also the distance from the lower edge of the lowermost slot to the lower surface of the block, and the latter distance is equal to the former. Moreover, where a block contains two or more slots 18, the same distance or space is provided between the top edge of each slot and the top edge of the next above or below slot. It is thus apparent that no matter in what arrangement the blocks are built up to form a column such as the column 10, the slots 18 in the assembled column will be equidistant.

The means for precision interlocking of the blocks to form the column, are illustrated in Figs. 3 and 9. Each of the blocks shown in the column of Fig. 1 has a bottom similar to that shown for the block 16 in Fig. 9, and all of the blocks except the topmost block 17 have the same top construction as that shown for the block 15 in Fig. 9.

Intermediate its width, the block 16 has a recess 19 in its bottom surface and the block 15 has a complementary recess 20 in its top surface. These recesses or, when the blocks are assembled, the combined recess 19—20, give access to the enlarged knurled barrel 21 intermediate the aligned and reversely threaded stems 22 and 23; that is, one of these stems bears a right-hand thread and the other a left-hand thread, and appropriately threaded aligned holes 24 and 25 are provided, respectively, in the bottom of the block 16 and the top of the block 15. In addition, on each side of the recess 19, the block 16 has an elongated vertical recess or hole, shown at 26 and 27, in which holes the upper ends of pins 28 register, being releasably retained by set screws 29 extending through passages 30 in the sides of the block. Similarly, the block 15 has, on each side of its recess 20, similar elongated recesses or holes, shown at 31 and 32; the hole 31 being alignable with the hole 26 and the hole 32 being alignable with the hole 27. It is thus apparent, assuming that the block 16 is to be mounted on the block 15, with the pins 28 and the stem 23 extending from the block 16, the pins 28 are readily insertible into the holes 31, 32 and the threaded stem 23 is engageable in the threaded hole 25. As the barrel 21 is rotated in one direction, the stems thereon will be threaded deeper into their respective threaded holes and thus draw the two blocks closer together. When the two blocks have thus been properly positioned, the one on the other, the set screws 29 are tightened against the upper ends of the stems in the block 16, and similar set screws 29 are tightened against the lower ends of the stems in the block 15. The stems 28 are preferably provided with appropriate conical recesses 33 in which the conical tips of the set screws register. Thus, stability of the column is assured, for even if the reversely threaded unit 21, 22, 23 should tend to loosen the set screws and stems assure tight interengagement of the blocks.

It is to be noted that each slot 18 has a plurality of horizontally spaced holes extending thereinto and through the block; in the illustration, three such holes are shown at 34, 35 and 36, the intermediate holes 35 being shown of larger diameter than the other two. These are all smooth holes through which screws may be slid.

Each of the two micrometer arms 12 and 13, which may of course be of any desired length, have similar forked bodies 37 and 38, each of which is formed of two parallel legs 39 and 40 which preferably have the same width or, in Fig. 1, the same height. The inner surface of the rear leg 39 is flat and thus adapted to lie flush against the rear surface of the column. The inner surface of the front leg 40, however, is provided with an elongated triangular ridge or tongue 41 complementary to the slot 18 so that the said ridge is adapted to register snugly in the slot 18. The leg 40 has a plurality of horizontally aligned groups of three holes each, each group comprising the holes 34a, 35a and 36a, the spacing between the holes of each group being the same as the spacing between the holes 34, 35 and 36 through the slots 18 and the blocks, each of the said holes through the leg 40 corresponding to that one of the holes 34, 35 and 36 bearing the same reference numeral except for the suffix "a." Similarly, the rear leg 39 has similarly arranged and corresponding groups of holes, each group comprising the holes 34b, 35b and 36b, in alignment, respectively, with the holes 34a 35a and 36a of the group of holes forward thereof in the leg 40. The holes 34b, 35b and 36b in the leg 39 are threaded, so that when screws 42 and 43 are passed through the aligned holes and screwed into the threaded holes 34b, 35b, and 36b, the arm or body 37 of the micrometer arm 12 is securely locked to the column in proper horizontal position. The same, of course, applies to the legs 39 and 40 of the body 38 of the micrometer anvil arm 13.

The upper micrometer arm body 37 has an extension 44 provided with a suitable threaded vertical opening therethrough receptive of the micrometer screw 46; the lower arm 13 has its body 38 provided with a similar extension 45 on which the anvil 47 is seated, in axial alignment with the screw 46. It is to be noted that the micrometer is so provided that the top surface of the anvil 47 lies in the same horizontal plane as that through the axes of the holes 34a, 35a and 36a, of the arm 13, and that the zero reading on the micrometer occurs when the tip of the screw thereof lies in the same horizontal plane as that through the axes of the holes 34a, 35a and 36a of the leg 40 of the upper arm 12.

It is thus seen that the assembled instrument may be used for precision micrometer measurements of a work piece positioned between the screw and the anvil of the micrometer, and that by suitable selection of column blocks to assemble the column together with suitable extension or retraction of the arms 12 and 13 with respect to the column, the same apparatus may be used for a wide range of sizes of work pieces.

When the size of the work piece to be measured is sufficiently large to require farther extension of the micrometer arms 12 and 13 from the column 10, suitable brackets such as that shown at 48 in Fig. 10, may be used. It comprises a body 50 having a vertical flat edge adapted to seat against the left-hand flat vertical edge of the column, and its front face or surface is provided with spaced V-grooves 18a identical in dimensions and spacing to the grooves 18 previously described; that is, the vertical distances between the troughs of adjacent grooves 18a are constant and the same as those between the troughs of the grooves 18. As in the case of the grooves 18 and depending on the size of the bracket and the lengths of the various grooves 18a it may bear, each groove has one or more groups of holes, such as the group 51, 52 and 53 which are similar to and are similarly spaced to the holes 34, 35 and 36 previously described, likewise passing through the bracket. The holes 51, 52 and 53 would, if the size of the bracket permitted, lie in transverse vertical planes, that is, for example, the hole 51 of each groove would be vertically above a corresponding hole 51 in the groove 18a below. However, since a relatively small bracket is shown at 48, not all of the grooves 18a have a full complement of such holes, there being but one hole 53 in the lowermost short groove 18a, which is positioned directly below the corresponding hole 53 in the next upper groove.

The bracket 48 is positioned as shown in Figs. 10 and 12, with one, preferably the topmost or the longest, groove 18a of the bracket in alignment with that groove 18 in which the ridge 41 of the micrometer arm registers, so that the left-hand portion of the said ridge also registers in the said groove 18a of the bracket. Then, since the holes 51, 52 and 53 of the said groove 18a of the bracket are axially aligned with a corresponding group of holes 34a, 35a and 36a of the micrometer leg 40 and also with a corresponding group of holes 34b, 35b and 36b of the micrometer leg 39, screws such as the screws 42, 43 are passed through the aligned passages thereby provided and are threaded into the holes 34b, 35b and 36b. Thus the bracket is held firmly in position between the micrometer legs 39 and 40.

Accessory strips 54 and 55, which have a triangular cross-section identical to the cross-section of the grooves 18 and 18a, are provided with longitudinally spaced groups of holes 51a, 52a and 53a which are similar and similarly spaced, to the holes bearing the same reference numerals without the suffix "a." The latter holes in the strips 54 and 55 as well as in the bracket, are also similar in spacing of the holes from each other to the spacing of the holes 34, 35 and 36 of the column blocks from each other. Thus, to further position the bracket firmly on the side of the column, each strip is mounted with one end in a groove 18a of the bracket and the other end mounted in the aligned groove 18 of the column block, Fig. 10. Appropriate screws 42a and 43a are then passed through the passages provided by the aligned sets of holes in the strips and the block 16 and are secured by nuts 76 on the back.

It is to be noted that all of the blocks shown at 14, 15, 16 and 17, forming the column, have aligned flanges 58 extending from the sides thereof at the rear thereof. These when aligned in the column may serve as a straight edge for scriving a line. However, in order to accommodate the vertical side of the bracket 48 to the flanged side of the column, a suitable corner groove 59 is provided at the rear in that side of the bracket, as shown in Figs. 11 and 13.

The base 11 shown in Fig. 1 is composed of two V-blocks 60 and 61 having opposed longitudinal grooves 62 and 63, respectively, in their opposed faces, the latter being wider and deeper than the former. With the blocks 60 and 61 positioned as shown in Fig. 1, a forked key 64 has its body 65 positioned between them and spaced from the column 10 and further has the two legs 66 and 67 thereof extending across the respective front and rear sides of the lowermost column block 14. The leg 66 is square in cross-section with the sides thereof positioned at forty-five degrees to the vertical and horizontal, so that one-half of the leg 66 constitutes a ridge or tongue similar to the ridge 41 and registers in the groove 18 of the lowermost block of the column. A similar and complementary slot 69 is provided in the block 60, in which the other half of the leg 66 similarly registers. The leg 67 has one flat surface 70 vertical, and this surface engages the back of the column block 14. Aligned openings 71 and 72 are provided through the blocks 60 and 61, as shown in Fig. 8, and passages 73 and 74 which are aligned respectively with the openings 71 and 72, are provided through the body 65 of the key 64. The openings 72 are threaded, and screws 75 passed through the aligned openings in these blocks and the key body, are screwed into the threaded openings 72 to lock the V-blocks firmly to the key body 65.

In the left-hand end or portion of the V-block 60, Fig. 1, holes 34', 35' and 36' are provided transversely therethrough, similar in spacing from each other and in size to, respectively, the holes 34, 35 and 36 in the column blocks, so that they align with the latter holes of the block 14 when the block 60 is positioned as shown in Fig. 1. Similar but threaded holes are provided through the left-hand portion of the block 61, but for the sake of simplicity but one such hole is shown at 36'', Fig. 14, in alignment with the hole 36 through the block 14 and the hole 36' through the block 60. Similar holes 34e, 35e and 36e are provided through the fork leg 67, and again, similar holes 34f, 35f and 36f are provided through the fork leg 66. Thus, when these parts are assembled as shown in Figs. 1 and 14, each set of aligned holes such as, reading from left to right, Fig. 14, the holes 36', 36f, 36, 36e and 36'', provides a continuous passage through the base of the column. Screws such as shown at 77 in Fig. 14 are then passed through these passages and are screwed into the threaded openings 36'' of the base block 61. Thus the assembled V-blocks 60 and 61 provide a solid base for the column 10, and the aligned top surfaces thereof provide a true horizontal surface to which the column 10 is truly at right angles, thus forming a precision square.

In practice, the height of each of the various blocks forming the column 10 will of course be accurately known, as well as the distances between the troughs of successive grooves 18, and such figures may be marked or indicated on the blocks. Although the top-most block 17 is shown with a flat top surface, this block may have the same top as that shown in Fig. 9 for the block 15.

When a work piece is to be measured or checked by the micrometer, suitable blocks are selected to build up the column to a height sufficient to position the work piece between the anvil and the screw of the arms 12 and 13. Then, knowing the distance from the anvil to the tip of the micrometer screw when the latter is in the zero position (since this distance is equal to the columnar length between the trough of the groove 18 in which the ridge 41 of the lower arm 13 is positioned and the trough of the groove 18 in which the ridge 41 of the upper arm 12 is positioned), it is obviously a simple matter to determine the measurement of the work piece by screwing down the micrometer screw to engage the top of the work piece.

It is apparent from the above that, given all or most of the various parts or members illustrated, an interchangeable measuring instrument has been provided covering a wide range of sizes or measurements, thus sparing the cost of acquiring a large number of standard precision instruments capable of a like range.

I claim:

1. A measuring instrument comprising a column composed of a plurality of upright blocks of the same rectangular horizontal cross-section mounted one upon the other, each of the said blocks having at least one horizontal groove in the vertical face thereof, said grooves all having the same cross-sectional conformation, means for interlocking said blocks, a pair of micrometer arms, one of said arms having a micrometer anvil thereon, the other of said arms having a micrometer screw thereon, each of said arms having a longitudinal ridge extending from the back thereof, said ridge having the same cross-sectional conformation and area as said grooves, said ridges hence being slidable in any of said grooves, said arms being adapted to be mounted on said column with said ridges registering in any two of said grooves, said arms being adapted to be positioned when mounted on said column with said one of said arms below said other of said arms and with said anvil and screw in vertical alignment, and means for locking said arms on said column in any of a plurality of spaced horizontal positions.

2. The instrument set forth in claim 1, said column having a base mounted thereon to support the column, said base comprising a pair of opposed blocks, one of said base blocks being positioned against the face of the column, the other of said base blocks being positioned against the back of the column, said one of said base blocks having a horizontal groove in the back thereof having the same cross-sectional conformation and area as said grooves in said blocks of the column and positioned in the same horizontal plane as said groove in the lowermost of said column blocks, said groove in said one of said base blocks and said groove in said lowermost column block thereby together forming a horizontal passage, a key having the same cross-sectional conformation and area as said passage being slidably mounted in said passage, said base blocks being elongated and extending outward from one side of the column thereby together with said column constituting a square, and means for locking said base blocks against the column.

3. The instrument set forth in claim 1, said cross-sectional conformations of said grooves and said ridges being triangular.

4. The instrument set forth in claim 1, some of said blocks having two or more of said horizontal grooves therein spaced equidistant at a given distance from each other, the lowermost of said grooves in each of said blocks being spaced one-half of said distance from the lower edge of the block, the uppermost of said grooves in each of said blocks being spaced one-half of said distance from the upper edge of the block, all of said grooves in said column thereby being successively spaced from each other at said distance.

5. The instrument set forth in claim 1, said first-named means comprising a threaded hole extending upward through the lower surface of a given block and a reversely threaded hole extending downward through the upper surface of the next lower block, said surfaces having juxtaposed transverse cut-outs having the entrances to said holes positioned therein, a barrel positioned in said juxtaposed cut-outs and having a threaded stem extending upward and threadably registering in said first-named hole, said barrel having a reversely threaded stem extending downward therefrom and threadably registering in said second-named hole, said holes in said blocks being positioned equidistant from the corresponding sides of the blocks.

6. The instrument set forth in claim 1, said first-named means comprising a threaded hole extending upward through the lower surface of a given block and a reversely threaded hole extending downward through the upper surface of the next lower block, said surfaces having juxtaposed transverse cut-outs having the entrances to said holes positioned therein, a barrel positioned in said juxtaposed cut-outs and having a threaded stem extending upward and threadably registering in said first-named hole, said barrel having a reversely threaded stem extending downward therefrom and threadably registering in said second-named hole, said holes in said blocks being positioned equidistant from the corresponding sides of the blocks, said blocks having at least one additional pair of opposed holes extending thereinto through said surfaces and positioned equidistant from the corresponding sides of the blocks, an elongated pin extending through both of said last-named holes, and means for locking said pin in said holes.

7. The instrument set forth in claim 1, said second-named means comprising, each of said grooves having a group of longitudinally spaced openings therethrough, the axes of said openings in each of said grooves lying in a common horizontal plane positioned midway of the height of the groove, each of said micrometer arms having a plurality of horizontally spaced like groups of horizontally spaced openings therethrough lying in a common horizontal plane, each of said groups of openings in said micrometer arms being therefore adapted to be aligned with one of said groups of openings in said grooves, a group of openings in a micrometer arm and a group of openings in a groove when thus aligned having stems passed therethrough, and means for locking said stems in said aligned openings.

8. The instrument set forth in claim 1, said second-named means comprising, each of said grooves having a group of longitudinally spaced openings therethrough, the axes of said openings in each of said grooves lying in a common horizontal plane positioned midway of the height of the groove, each of said micrometer arms having a plurality of horizontally spaced like groups of horizontally spaced openings therethrough lying in a common horizontal plane, each of said groups of openings in said micrometer arms being therefore adapted to be aligned with one of said groups of openings in said grooves, each of said micrometer arms comprising a body extending outward from the arm, said micrometer anvil and said micrometer screw being positioned on the respective extensions of said arms, said extension having a second arm thereon positioned rearward of and parallel with said first-named micrometer arm, said second arm having the same plurality of groups of openings therethrough as said first-named arm in alignment with said openings in said first-named arm, said openings in said second-named arm being threaded, a pair of aligned groups of openings in said first-named and said second-named arms when aligned with a group of openings in one of said grooves having screws passed therethrough and threaded in said threaded openings of said second-named arm.

9. The instrument set forth in claim 1, having a bracket for additionally supporting one of said micrometer arms when in extended position with respect to the column, said bracket having two sides at right angles to each other, one of said sides being positioned against one side of the column, the other of said sides being positioned parallel with the micrometer arm, the face of the bracket having vertically spaced horizontal grooves similar in cross-section and similar in spacing to said first-named grooves, said bracket grooves being adapted to be aligned with said first-named grooves, elongated strips having the same cross-section as said grooves having one end registering in a bracket groove and the other end registering in the corresponding of the first-named grooves, and means for locking said strips to said bracket and to said column.

10. The instrument set forth in claim 1, having an angle-shaped bracket for additionally supporting either of said micrometer arms in extended position with respect to the column, one side of said bracket being positioned against one side of the column, said conformation of said grooves and said ridge being triangular, the face of said bracket having at least one similar triangular groove at right angles to said one side of the bracket, said bracket being positioned rearward of the micrometer arm with said groove thereof in alignment with the corresponding groove of the column block in which said ridge of the micrometer arm registers, said ridge having a length greater than the width of the column and having a portion thereof registering in said bracket groove, and additional means securing said ridge portion in said bracket groove.

PETER DARABARIS.

No references cited.